US006859506B1

(12) United States Patent
McCorkle

(10) Patent No.: US 6,859,506 B1
(45) Date of Patent: Feb. 22, 2005

(54) ULTRA WIDEBAND COMMUNICATION SYSTEM, METHOD, AND DEVICE WITH LOW NOISE RECEPTION

(75) Inventor: John W. McCorkle, Laurel, MD (US)

(73) Assignee: Freescale Semiconductor, Inc., Austin, TX (US)

( * ) Notice: Subject to any disclaimer, the term of this patent is extended or adjusted under 35 U.S.C. 154(b) by 744 days.

(21) Appl. No.: 09/684,782

(22) Filed: Oct. 10, 2000

(51) Int. Cl.$^7$ .............................. H03K 5/01; H04B 1/10; H04L 1/00; H04L 25/08

(52) U.S. Cl. ...................... 375/346; 375/285; 375/144; 375/148; 455/296; 455/63; 455/130; 455/313

(58) Field of Search ........................... 455/130, 20, 63, 455/67.3, 131, 278.1, 284, 296, 313, 323; 375/130, 144, 148, 259, 260, 265, 333, 346, 348, 350

(56) References Cited

U.S. PATENT DOCUMENTS

| | | | | |
|---|---|---|---|---|
| 4,159,399 A | * | 6/1979 | Asakawa et al. | 380/260 |
| 5,345,471 A | * | 9/1994 | McEwan | 375/130 |
| 5,523,760 A | * | 6/1996 | McEwan | 342/89 |
| 5,619,527 A | * | 4/1997 | Kuroyanagi et al. | 375/147 |
| 5,677,927 A | | 10/1997 | Fullerton | |
| 5,838,717 A | * | 11/1998 | Ishii et al. | 375/131 |
| 5,978,412 A | * | 11/1999 | Takai | 375/145 |
| 6,112,069 A | * | 8/2000 | Na | 455/296 |
| 6,239,741 B1 | * | 5/2001 | Fontana et al. | 342/135 |
| 6,246,715 B1 | * | 6/2001 | Park et al. | 375/146 |
| 6,351,246 B1 | | 2/2002 | McCorkle | |
| 6,505,032 B1 | | 1/2003 | McCorkle | |
| 6,603,818 B1 | * | 8/2003 | Dress et al. | 375/295 |
| 6,606,350 B2 | * | 8/2003 | Dress et al. | 375/213 |
| 6,621,878 B2 | * | 9/2003 | Dress et al. | 375/316 |
| 6,625,229 B2 | * | 9/2003 | Dress et al. | 375/295 |
| 6,700,939 B1 | | 3/2004 | McCorkle | |
| 6,735,238 B1 | | 5/2004 | McCorkle | |
| 2001/0005394 A1 | * | 6/2001 | Park et al. | 375/141 |

FOREIGN PATENT DOCUMENTS

EP 001168698 A1 * 1/2002

OTHER PUBLICATIONS

Rong Wang, et al.,"Performance of MC–CDMA based on wavelet packets in Rayleigh multipath fading channel", Electronics Letters, IEE Stevenage, GB, vol. 36, No. 12, Jun. 8, 2000.

Philip L. Ainsleigh, et al., "A B–Wavelet–Based Noise–Reduction Algorithm", IEEE Transactions on Signal Processing, vol. 44, No. 5, May 1996, pp. 1279–1284.

Oguz Kucur, et al., Performance of Scale–Code Division Multiple Access (SCDMA) Over the Asynchronous AWGN Channel Vehicular Technology Conference, 1999 IEEE 49$^{th}$ Houston, TX, May 1999, pp. 2204–2208.

F. Daneshgaran, et al., "Clock Synchronisation without self–noise using wavelets", Electronics Letters, IEEE, vol. 31, No. 10, May 11, 1995, pp. 775–776.

U.S. Provisional application No. 60/207,225, McCorkle, filed May 26, 2000.

U.S. Provisional application No. 60/217,099, Miller, filed Jul. 10, 2000.

(List continued on next page.)

*Primary Examiner*—Jean B. Corrielus
(74) *Attorney, Agent, or Firm*—Posz & Bethards, PLC

(57) ABSTRACT

An ultra-wide band (UWB) waveform receiver with noise cancellation for use in a UWB digital communication system. The UWB receiver uses a two-stage mixing approach to cancel noise and bias in the receiver. Self-jamming is prevented by inverting a portion of the received signal in the first mixer and then coherently detecting the partially and synchronously inverted signal in the second mixer. Since the drive signals on both mixers are not matched to the desired signal, leakage of either drive signal does not jam the desired signal preventing the receiver from detecting and decoding a weak signal.

14 Claims, 7 Drawing Sheets

OTHER PUBLICATIONS

U.S. patent application Ser. No. 09/633,815, McCorkle, filed Aug. 7, 2000.
U.S. Provisional application No. 60/238,466, McCorkle, filed Oct. 10, 2000.
U.S. patent application Ser. No. 09/684,401, Miller, filed Oct. 10, 2000.
U.S. patent application Ser. No. 09/685,195, Miller, filed Oct. 10, 2000.
U.S. patent application Ser. No. 09/685,196, Miller, filed Oct. 10, 2000.
U.S. patent application Ser. No. 09/685,197, Miller, filed Oct. 10, 2000.
U.S. patent application Ser. No. 09/685,198, McCorkle, filed Oct. 10, 2000.
U.S. patent application Ser. No. 09/685,199, McCorkle, filed Oct. 10, 2000.
U.S. patent application Ser. No. 09/685,200, McCorkle, filed Oct. 10, 2000.
U.S. patent application Ser. No. 09/685,202, Rofheart, filed Oct. 10, 2000.
U.S. patent application Ser. No. 09/685,203, Miller, filed Oct. 10, 2000.
U.S. patent application Ser. No. 09/685,205, McCorkle, filed Oct. 10, 2000.

* cited by examiner

US 6,859,506 B1

ULTRA WIDEBAND COMMUNICATION SYSTEM, METHOD, AND DEVICE WITH LOW NOISE RECEPTION

CROSS REFERENCE TO RELATED PATENT DOCUMENTS

The present document contains subject matter related to that disclosed in commonly owned, co-pending application Ser. No. 09/209,460 filed May 14, 1998, entitled ULTRA WIDE BANDWIDTH SPREAD-SPECTRUM COMMUNICATIONS SYSTEM); Ser. No. 09/633,815, filed Aug. 7, 2000 entitled ELECTRICALLY SMALL PLANAR UWB ANTENNA; application Ser. No. 09/563,292, filed May 3, 2000 entitled PLANAR UWB ANTENNA WITH INTEGRATED TRANSMITTER AND RECEIVER CIRCUITS; Application Ser. No. 60/207,225 filed May 26, 2000, entitles ULTRAWIDEBAND COMMUNICATIONS SYSTEM AND METHOD; application Ser. No. 09/685,198, filed Oct. 10, 2000, entitled ANALOG SIGNAL SEPARATOR FOR UWB VERSUS NARROWBAND SIGNALS; Application Ser. No. 60/238,466, filed Oct. 10, 2000, entitled ULTRA WIDE BANDWIDTH NOISE CANCELLATION MECHANISM AND METHOD); Application Ser. No. 60/217,099 filed Jul. 10, 2000 entitled MULTIMEDIA WIRELESS PERSONAL AREA SYSTEM NETWORK (WPAN) PHYSICAL LAYER SYSTEM AND METHOD); application Ser. No. 09/685,203, filed Oct. 10, 2000, entitled SYSTEM AND METHOD FOR BASEBAND REMOVAL OF NARROWBAND INTERFERENCE IN ULTRA WIDEBAND SIGNALS; application Ser. No. 09/685,197, filed Oct. 10, 2000, entitled MODE CONTROLLER FOR SIGNAL ACQUISITION AND TRACKING IN AN ULTRA WIDEBAND COMMUNICATION SYSTEM; application Ser. No. 09/684,400, filed Oct. 10, 2000, entitled ULTRA WIDEBAND COMMUNICATION SYSTEM WITH LOW NOISE PULSE FORMATION; application Ser. No., 09/685,195, filed Oct. 10, 2000, entitled ULTRA WIDE BANDWIDTH SYSTEM AND METHOD FOR FAST SYNCHRONIZATION; application Ser. No. 09/684,401, filed Oct. 10, 2000, entitled ULTRA WIDE BANDWIDTH SYSTEM AND METHOD FOR FAST SYNCHRONIZATION USING SUB CODE SPINS; application Ser. No., 09/685,196, filed Oct. 10, 2000, entitled ULTRA WIDE BANDWIDTH SYSTEM AND METHOD FOR FAST SYNCHRONIZATION USING MULTIPLE DETECTION ARMS; application Ser. No., 09/685,199, filed Oct. 10, 2000, entitled A LOW POWER, HIGH RESOLUTION TIMING GENERATOR FOR ULTRA-WIDE BANDWIDTH COMMUNICATIONS SYSTEMS; application Ser. No. 09/685,202, filed Oct. 10, 2000, entitled METHOD AND SYSTEM FOR ENABLING DEVICE FUNCTIONS BASED ON DISTANCE FORMANCE; and application Ser. No. 09/685,201, filed Oct. 10, 2000, entitled CARRIERLESS ULTRA WIDEBAND WIRELESS SIGNALS FOR CONVEYING APPLICATION DATA; application Ser. No. 09/685,205, filed Oct. 10, 2000 entitled SYSTEM AND METHOD FOR GENERATOR ULTRA WIDEBAND PULSES and application Ser. No. 09/685,200, filed Oct. 10, 2000, entitled LEAKAGE NULLING RECEIVER CORRELATOR STRUCTURE AND METHOD FOR ULTRA WIDE BANDWIDTH COMMUNICATION-S SYSTEM, the entire contents of each of which being incorporated herein by reference

BACKGROUND OF THE INVENTION

1. Field of the Invention

The present invention relates to ultra wideband (UWB) radio communication systems, methods and devices used in the system for generating and receiving UWB waveforms that include wavelets that are modulated to convey digital data over a wireless radio communication channel using ultra wideband signaling techniques.

2. Description of the Background

There are numerous radio communication techniques to transmit digital data over a wireless channel. These techniques include those used in mobile telephone systems, pagers, remote data collection systems, and wireless networks for computers, among others. Most conventional wireless communication techniques modulate the digital data onto a high-frequency carrier that is then transmitted via an antenna into space.

Ultra wideband (UWB) communications systems transmit carrierless high data rate, low power signals. Since a carrier is not used, the transmitted waveforms themselves contain the information being communicated. Accordingly, conventional UWB systems transmit pulses, the information to be communicated is contained in the pulses themselves, and not on a carrier.

Conventional UWB communication systems send a sequence of identical pulses, the timing of which carries the information being communicated, for example, as described by Fullerton and Cowie (U.S. Pat. No. 5,677,927). This technique is known as pulse position modulation (PPM). In a PPM scheme, the information in a pulse is obtained by determining an arrival time of the pulse at a receiver relative to other pulses. For example, given an exemplary time window, if a pulse is received at the beginning of that time window, the receiver will decode that pulse as a '1,' whereas if the pulse is received at the end of that same time window, the receiver will decode that pulse as a '0.'

Several problems arise with this technique, however, as recognized by the present inventors. First, it is not as efficient as other techniques, for example, sending non-inverted and inverted pulses where 3 dB less radiated power is required to communicate in the same memory-less Gaussian white noise channel. Second, reflections from objects in the vicinity of the transmitter and receiver can cause a pulse that was supposed to be at the beginning of the time window, to appear in at the end of time window, or even in the time window of a subsequent pulse.

As a result, it would be advantageous if the data stream to be transmitted could be encoded by changing a shape of the UWB pulse rather than a position of the UWB pulse as with conventional systems. For example, if the UWB pulses had two possible shapes, a single time frame could be used encode a single bit of data, rather than the two time frames (i.e., early and late) that would be required by a PPM system. In the present UWB communications system, and related co-pending application Ser. No. 09/209,460 filed May 14, 1998, entitled ULTRA WIDE BANDWIDTH SPREAD SPECTRUM COMMUNICATIONS SYSTEM, information is carried by the shape of the pulse, or the shape in combination with its position in the pulse-sequence.

Conventional techniques for generating pulses include a variety of techniques, for example, networks of transmission lines such as those described in co-pending application Ser. No. 09/209,460 filed May 14, 1998, entitled ULTRA WIDE BANDWIDTH SPREAD SPECTRUM COMMUNICATIONS SYSTEM. One of the problems associated with this technique is that the transmission lines take up sizeable space and accordingly, are not amenable to integration on a monolithic integrated circuit. Given that a key targeted use of UWB systems is for small, handheld mobile devices such as personal digital assistants (PDAs) and mobile telephones, space is at a premium when designing UWB systems. Furthermore, it is highly desirable to integrate the entire radio onto a single monolithic integrated circuit in order to meet the cost, performance, and volume-production requirements of consumer electronics devices.

A key attribute that must be maintained, however, regardless of how the information is carried, is that no tones can be present. In other words, the average power spectrum must be smooth and void of any spikes. In generating these UWB pulse streams, however, non-X ideal device performance can cause tones to pass through to the antenna and to be radiated. In particular, switches, gates, and analog mixers that are used to generate pulses are well known to be non-ideal devices. For example, leakage is a problem. A signal that is supposed to be blocked at certain times, for example, can continue to leak through. Similarly, non-ideal symmetry in positive and negative voltages or current directions can allow tones be generated or leak through. In another example, the output of a mixer can include not only the desired UTWB pulse stream, but also spikes in the frequency domain at the clock frequency and its harmonics, as well as other noise, due to leakage between the RF, LO, and IF ports. This is problematic since one of the design objectives is to generate a pulse stream that will not interfere with other communications systems.

Similar problems to those discussed above regarding transmitters are also encountered in UWB receivers. Mixers are used in UWB receivers to mix the received signal with matching waveforms so that the data transmitted may be decoded. As discussed above, the spectral spikes (DC and otherwise) introduced by the non-ideal analog mixers can make decoding of only moderately weak signals difficult or impossible.

Furthermore, UWB receivers often suffer from leakage of the UWB signal driving the mixer. These UWB drive signals can radiate into space and be received by the antenna where it can jam the desired UWB signal due to its very close proximity and large amplitude. This reception of the drive signal being used to decode the received signal can therefore cause a self-jamming condition wherein the desired signal becomes unintelligible.

The challenge, then, as presently recognized, is to develop a highly integratable approach for generating shape-modulated wavelet sequences that can be used in a UWB communications system to encode, broadcast, receive, and decode a data stream. It would be C) advantageous if the data stream to be transmitted could be encoded by changing a shape of the UWB pulse rather than a position of the UWB pulse as with conventional systems.

Furthermore, the challenge is to build such a wavelet generator where the smooth power spectrum calculated by using ideal components, is realized using non-ideal components. In other words, an approach to generating and receiving UWB waveforms that does not generate unwanted frequency domain spikes as a by-product, spikes that are prone to interfere with other communications devices or cause self-jamming, would be advantageous.

It would also be advantageous if the UWB waveform generation approach were to minimize the power consumption because many of the targeted applications for UWB communications are in handheld battery-operated mobile devices.

SUMMARY OF THE INVENTION

Accordingly, one object of this invention is to provide a novel receiver for use in a UWB communication system that addresses the above-identified and other problems with conventional devices.

The inventors of the present invention have recognized that by implementing a two-mixer approach to receiving UWB waveforms, that the noise leakage from the non-ideal analog mixers can be whitened, thereby avoiding the interference problems caused by conventional single-mixer approaches. The present inventors have provided a contrarian approach of suppressing mixer-created interference by using a second mixer.

These and other objects are achieved according to the present invention by providing a novel circuit using a two-mixer approach for decoding a received UWB waveform having a stream of wavelets while canceling the leakage introduced by non-ideal analog mixers and avoiding self-jamming.

In one embodiment, the UWB receiver uses a conventional differential mixer to mix a received waveform of a sequence of UWB wavelets not with a correlated and synchronized sequence of wavelets as has been done in conventional systems, but rather, with a synchronized n-bit user polarity code, the same user code that was used to encode the data stream at the UWB transmitter. The n-bit user polarity code is a non-return-to zero code, not wavelets. Accordingly, by mixing the received signal with this synchronized code, the received wavelets will be either passed through the mixer non-inverted (if mixed with a NRZ '1'), or inverted (if mixed with a NRZ '0'). As a result, the output of the first differential mixer is a waveform that has sequences of n wavelets, all in an upright orientation, or all in an inverted orientation, according to the data stream transmitted. The UWB receiver has a synchronized UWB wavelet generator that generates wavelets according to the same shape coding that was used by the transmitter, except always having the same polarity. The output of this receiver wavelet generator is mixed with the output signal of the first mixer using a second mixer. The output of the second differential mixer will be a waveform that has sequences of coherently detected wavelets, where each group of n wavelets has only positive components (e.g., corresponding to a data '1'), or only negative components (e.g., corresponding to a data '0'), depending on the data being sent. The output waveform has this characteristic because mixing a positive-negative wavelet with itself will produce a positive—positive wavelet, and conversely, mixing a positive-negative wavelet with an inverted representation of itself (i.e., a negative-positive wavelet) will result in a negative—negative wavelet. These all-positive or all-negative wavelets are then integrated and sampled in order to decode the transmitted data stream.

The inventors of the present invention have recognized that by using two non-ideal mixers, the interference produced by the first mixer due to imbalance, non-linearity, and leakage between ports, is whitened (i.e., spread over a wide range) by mixing it's output with the output of the wavelet generator. Furthermore, by mixing the received waveform with a NRZ user code, the present inventors have recognized that leakage (e.g., radiated through the air and coupled into the receive antenna, or coupled via the substrate or wiring due to the close proximity of parts in a miniaturized radio) from the wavelet generator in the receiver is whitened because it is no longer coherent to itself by the time it reaches the second mixer. Instead, the coupled leakage becomes pseudo-randomly inverted and non-inverted in the first mixer by the NRZ code such that its contribution to the output of the second mixer integrates toward zero in the integrator. Furthermore, any similar leakage of the NRZ user code could self-mix to produce a positive or negative output at the first mixer. This low frequency component, however, is blocked by a coupling network between the two mixers, shown, for example, as a DC blocking capacitor in FIG. 4. Both these forms of leakage are particularly troubling since they dynamically change with the environment, which affects the coupling. Finally, the leakage from the NRZ signal that passes through the second mixer, plus the leakage of the wavelet driving the second mixer, tend to be zero-mean and spiky, but most importantly are synchronized with the integrator and A/D timing. As a result, the error is constant and can be estimated and removed by the receiver controller and interface, by a servo-loop that sets the A/D zero-reference voltage, or by setting up the coding so as to add and subtract chips such that these leakage terms cancel.

In one embodiment, the conventional mixer is a Gilbert cell mixer. In other embodiments, the mixer is, for example, a diode bridge mixer, or any electrically, optically, or mechanically-driven configuration of switching devices including, for example, an FET, a bulk semiconductor device, or a micro-machine device.

Consistent with the title of this section, the above summary is not intended to be an exhaustive discussion of all the features or embodiments of the present invention. A more complete, although not necessarily exhaustive description of the features and embodiments of the invention is found in the section entitled "DESCRIPTION OF THE PREFERRED EMBODIMENTS" as well as the entire document generally.

DESCRIPTION OF THE PREFERRED EMBODIMENTS

Figure 1A:
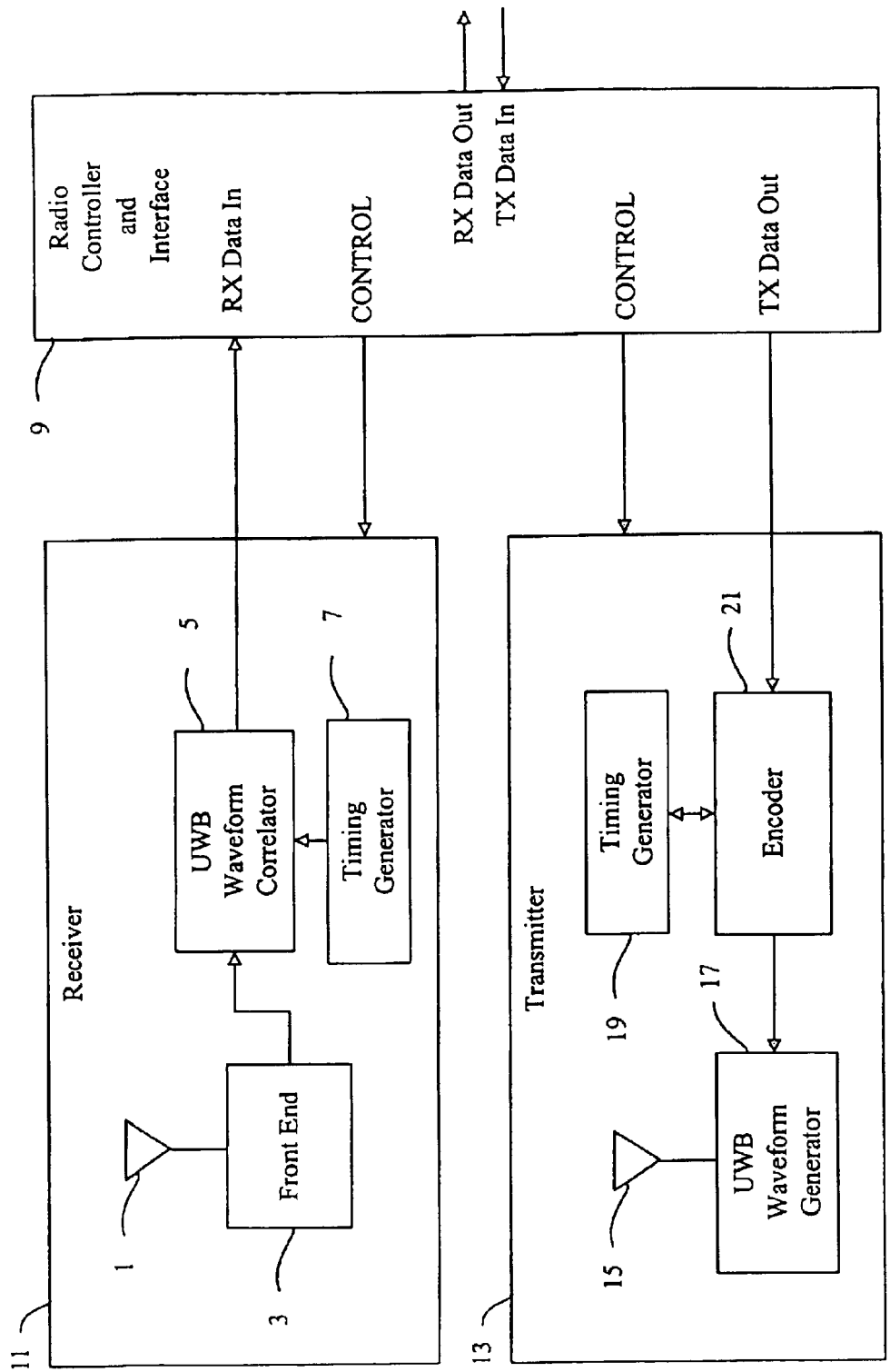
FIG. 1a is a block diagram of an ultra-wide band (UWB) transceiver, according to the present invention.

FIG. 1a is a block diagram of an ultra-wide band (UWB) transceiver. In FIG. 1a, the transceiver includes three major components, namely, receiver 11, radio controller and interface 9, and transmitter 13. Alternatively, the system may be implemented as a separate receiver 11 and radio controller and interface 9, and a separate transmitter 13 and radio controller and interface 9. The radio controller and interface 9 serves as a media access control (MAC) interface between the UWB wireless communication functions implemented by the receiver 11 and transmitter 13 and applications that use the UWB communications channel for exchanging data with remote devices.

The receiver 11 includes an antenna 1 that converts a UWB electromagnetic waveform into an electrical signal (or optical signal) for subsequent processing. The UWB signal is generated with a sequence of shape-modulated wavelets, where the occurrence times of the shape-modulated wavelets may also be modulated. For analog modulation, at least one of the shape control parameters is modulated with the analog signal. More typically, the wavelets take on M possible shapes. Digital information is encoded to use one or a combination of the M wavelet shapes and occurrence times to communicate information.

In one embodiment of the present invention, each wavelet communicates one bit, for example, using two shapes such as bi-phase. In other embodiments of the present invention, each wavelet may be configured to communicate nn bits, where $M \geq 2^{nn}$. For example, four shapes may be configured to communicate two bits, such as with quadrature phase or four-level amplitude modulation. In another embodiment of the present invention, each wavelet is a "chip" in a code sequence, where the sequence, as a group, communicates one or more bits. The code can be M-ary at the chip level, choosing from M possible shapes for each chip.

At the chip, or wavelet level, embodiments of the present invention produce UWB waveforms. The UWB waveforms are modulated by a variety of techniques including but not limited to: (i) bi-phase modulated signals (+1, −1), (ii) multilevel bi-phase signals (+1, −1, +a1, −a1, +a2, −a2, ... , +aN, −aN), (iii) quadrature phase signals (+1, −1, +j, j), (iv) multi-phase signals (1, −1, exp(+jπ/N), exp(−jπ/N), exp(+jπ2/N), exp(−jπ2/N), . . . , exp(+j(N−1)/N), exp(−jπ(N−1)/N)), (v) multilevel multi-phase signals ($a_i$ exp(j2πβ/N) $|a_i \in \{1, a1, a2, \ldots, aK\}, \beta \in (0, 1, \ldots, N-1)$), (vi) frequency modulated pulses, (vii) pulse position modulation (PPM) signals (possibly same shape pulse transmitted in different candidate time slots), (viii) M-ary modulated waveforms $g_{B_i}(t)$ with $B_i \in \{1, \ldots, M\}$, and (ix) any combination of the above waveforms, such as multi-phase channel symbols transmitted according to a chirping signaling scheme. The present invention, however, is applicable to variations of the above modulation schemes and other modulation schemes (e.g., as described in Lathi, "Modem Digital and Analog Communications Systems," Holt, Rinehart and Winston, 1998, the entire contents of which is incorporated by reference herein), as will be appreciated by those skilled in the relevant art(s).

Some exemplary waveforms and characteristic equations thereof will now be described. The time modulation component, for example, can be defined as follows. Let $t_i$ be the time spacing between the $(i-1)^{th}$ pulse and the $i^{th}$ pulse. Accordingly, the total time to the $i^{th}$ pulse is $$T_i = \sum_{j=0}^{i} t_j.$$

The signal $T_i$ could be encoded for data, part of a spreading code or user code, or some combination thereof. For example, the signal $T_i$ could be equally spaced, or part of a spreading code, where $T_i$ corresponds to the zero-crossings of a chirp, i.e., the sequence of $T_i$'s, and where $$T_i = \sqrt{\frac{i-a}{k}}$$

for a predetermined set of a and k. Here, a and k may also be chosen from a finite set based on the user code or encoded data.

An embodiment of the present invention can be described using M-ary modulation. Equation 1 below can be used to represent a sequence of exemplary transmitted or received pulses, where each pulse is a shape modulated UWB wavelet, $g_{B_i}(t-T_i)$.

$$x(t) = \sum_{i=0}^{\infty} g_{B_i}(t - T_i) \qquad (1)$$

In the above equation, the subscript i refers to the $i^{th}$ pulse in the sequence of UWB pulses transmitted or received. The wavelet function g has M possible shapes, and therefore $B_i$ represents a mapping from the data, to one of the M-ary modulation shapes at the $i^{th}$ pulse in the sequence. The wavelet generator hardware (e.g., the UWB waveform generator 17) has several control lines (e.g., coming from the radio controller and interface 9) that govern the shape of the wavelet. Therefore, $B_i$ can be thought of as including a lookup-table for the M combinations of control signals that produce the M desired wavelet shapes. The encoder 21 combines the data stream and codes to generate the M-ary states. Demodulation occurs in the waveform correlator 5 and the radio controller and interface 9 to recover to the original data stream. Time position and wavelet shape are combined into the pulse sequence to convey information, implement user codes, etc.

In the above case, the signal is comprised of wavelets from i=1 to infinity. As i is incremented, a wavelet is produced. Equation 2 below can be used to represent a generic wavelet pulse function, whose shape can be changed from pulse to pulse to convey information or implement user codes, etc.

$$g_{B_i}(t) = re(B_{i,1}) \cdot f_{B_{i,2}, B_{i,3}, \ldots}(t) + Im(B_{i,1}) \cdot h_{B_{i,2}, B_{i,3}, \ldots}(t) \qquad (2)$$

In the above equation, function f defines a basic wavelet shape, and function h is simply the Hilbert transform of the function f. The parameter $B_{i,1}$ is a complex number allowing the magnitude and phase of each wavelet pulse to be adjusted, i.e., $B_{i,1} = a_i \angle \theta_i$, where $a_1$ is selected from a finite set of amplitudes and $\theta_i$ is selected from a finite set of phases. The parameters $\{B_{i,2}, B_{i,3}, \ldots\}$ represent a generic group of parameters that control the wavelet shape.

An exemplary waveform sequence x(t) can be based on a family of wavelet pulse shapes f that are derivatives of a Guassian waveform as defined by Equation 3 below.

$$f_{B_i}(t) = \Psi(B_{i,2}, B_{i,3}) \left( \frac{d^{B_{i,3}}}{dt^{B_{i,3}}} e^{-[B_{i,2}t]^2} \right) \qquad (3)$$

In the above equation, the function $\Psi(\ )$ normalizes the peak absolute value of $f_{B_i}(t)$ to 1. The parameter $B_{i,2}$ controls the pulse duration and center frequency. The parameter $B_{i,3}$ is the number of derivatives and controls the bandwidth and center frequency.

Another exemplary waveform sequence x(i) can be based on a family of wavelet pulse shapes f that are Gaussian weighted sinusoidal functions, as described by Equation 4 below.

$$f_{B_{i,1}, B_{i,3}, B_{i,4}} = f_{\omega_i, k_i, b_i}(t) = e^{-[b_i t]^2} \sin(\omega_i t + k_i t^2) \qquad (4)$$

In the above equation, $b_i$ controls the pulse duration, ad controls the center frequency, and $k_i$ controls a chirp rate. Other exemplary weighting functions, beside Gaussian, that are also applicable to the present invention include, for example, Rectangular, Hamming, Hamming, Blackman-Harris, Nutall, Taylor, Kaiser, Chebychev, etc.

Another exemplary waveform sequence x(t) can be based on a family of wavelet pulse shapes f that are inverse-exponentially weighted sinusoidal functions, as described by Equation 5 below.

$$g_{B_i}(t) = \left( \frac{1}{e^{\frac{-(t-t1_i)}{.3*b_1}+1}} - \frac{1}{e^{\frac{-(t-t2_i)}{.3*tf_1}+1}} \right) \cdot \sin(\theta_i + \omega_i t + k_i t^2) \qquad (5)$$

where $\{B_{i,2}, B_{i,3}, B_{i,4}, B_{i,5}, B_{i,6}, B_{i,7}, B_{i,8}\} = \{t=t_1, t_2, t_r, t_f, \theta_i, \omega_i, k_i\}$ In the above equation, the leading edge turn on time is controlled by $t_1$, and the turn-on rate is controlled by $t_r$. The trailing edge turn-off time is controlled by 12, and the turn-off rate is controlled by $t_f$. Assuming the chirp starts at t=0 and $T_D$ is the pulse duration, the starting phase is controlled by $\theta$, the starting frequency is controlled by $\omega$, the chirp rate is controlled by k, and the stopping frequency is controlled by $\omega + kT_D$. An example assignment of parameter values is w=1, $t_r = t_f = 0.25$, $t_1 = t_r/0.51$, and $t_2 = T_D - t_r/9$.

A feature of the present invention is that the M-ary parameter set used to control the wavelet shape is chosen so as to make a UWB signal, wherein the center frequency $f_c$ and the bandwidth B of the power spectrum of g(t) satisfies $2f_c > B > 0.25 f_c$. It should be noted that conventional equations define in-phase and quadrature signals (e.g., often referred to as 1 and Q) as sine and cosine terms. An important observation, however, is that this conventional definition is inadequate for UWB signals. The present invention recognizes that use of such conventional definition may lead to DC offset problems and inferior performance.

Furthermore, such inadequacies get progressively worse as the bandwidth moves away from $0.25f_c$ and toward $2f_c$. A key attribute of the exemplary wavelets (or e.g., those described in co-pending U.S. patent application Ser. No. 09/209,460) is 7 at the parameters are chosen such that neither f nor h in Equation 2 above has a DC component, yet f and h exhibit the required wide relative bandwidth for UWB systems.

Similarly, as a result of $B > 0.25f_c$, it should be noted that the matched filter output of the UWB signal is typically only a few cycles, or even a single cycle. For example, the parameter n in Equation 3 above may only take on low values such as those described in co-pending U.S. patent application Ser. No. 09/209,460).

Figure 1B:
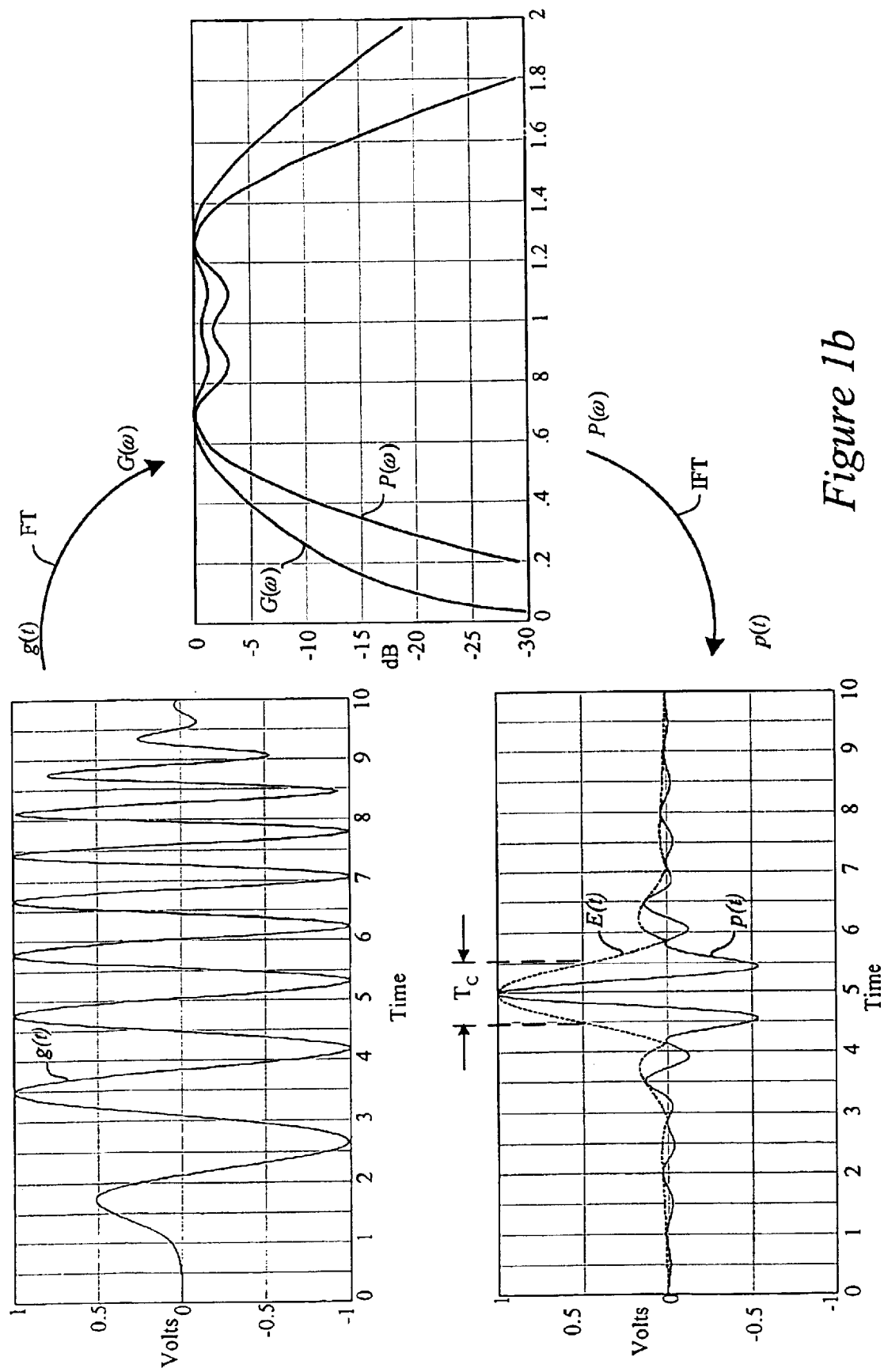
FIG. 1b is a diagram for illustrating the operation of the transceiver of FIG. 1a, according to the present invention.

The compressed (i.e., coherent matched filtered) pulse width of a UWB wavelet will now be defined with reference to FIG. 1b. In FIG. 1b, the time domain version of the wavelet thus represents g(t) and the Fourier transform (FT) version is represented by G($\omega$). Accordingly, the matched filter is represented as G*($\omega$), the complex conjugate, so that the output of the matched filter is P($\omega$)=G($\omega$)·G*($\omega$). The output of the matched filter in the time domain is seen by performing an inverse Fourier transform (IFT) on P($\omega$) so as to obtain p(t), the compressed or matched filtered pulse. The width of the compressed pulse p(t) is defined by $T_C$, which is the time between the points on the envelope of the compressed pulse E(t) that are 6 dB below the peak thereof, as shown in FIG. 1b. The envelope waveform E(t) may be determined by Equation 6 below.

$$E(t) = \sqrt{(p(t))^2 + (p^H(t))^2} \quad (6)$$

where $p^H(t)$ is the Hilbert transform of p(t).

Accordingly, the above-noted parameterized waveforms are examples of UWB wavelet functions that can be controlled to communicate information with a large parameter space for making codes with good resulting autocorrelation and cross-correlation functions. For digital modulation, each of the parameters is chosen from a predetermined list according to an encoder that receives the digital data to be communicated. For analog modulation, at least one parameter is changed dynamically according to some function (e.g., proportionally) of the analog signal that is to be communicated.

Referring back to FIG. 1a, the electrical signals coupled in through the antenna 1 are passed to a radio front end 3. Depending on the type of waveform, the radio front end 3 processes the electric signals so that the level of the signal and spectral components of the signal are suitable for processing in the UWB waveform correlator 5. The UWB waveform correlator 5 correlates the incoming signal (e.g., as modified by any spectral shaping, such as a matched filtering, partially matched filtering, simply roll-off, etc., accomplished in front end 3) with different candidate signals generated by the receiver 11, so as to determine when the receiver 11 is synchronized with the received signal and to determine the data that was transmitted.

The timing generator 7 of the receiver 11 operates under control of the radio controller and interface 9 to provide a clock signal that is used in the correlation process performed in the UWB waveform correlator 5. Moreover, in the receiver 11, the UWB waveform correlator 5 correlates in time a particular pulse sequence produced at the receiver 11 with the receive pulse sequence that was coupled in through antenna 1 and modified by front end 3. When the two such sequences are aligned with one another, the UWB waveform correlator 5 provides high signal to noise ratio (SNR) data to the radio controller and interface 9 for subsequent processing. In some circumstances, the output of the UWB waveform correlator 5 is the data itself. In other circumstances, the UWB waveform correlator 5 simply provides an intermediate correlation result, which the radio controller and interface 9 uses to determine the data and determine when the receiver 11 is synchronized with the incoming signal.

In some embodiments of the present invention, when synchronization is not achieved (e.g., during a signal acquisition mode of operation), the radio controller and interface 9 provides a control signal to the receiver 11 to acquire synchronization. In this way, a sliding of a correlation window within the UWB waveform correlator 5 is possible by adjustment of the phase and frequency of the output of the timing generator 7 of the receiver 11 via a control signal from the radio controller and interface 9. The control signal causes the correlation window to slide until lock is achieved. The radio controller and interface 9 is a processor-based unit that is implemented either with hard wired logic, such as in one or more application specific integrated circuits (ASICs) or in one or more programmable processors.

Once synchronized, the receiver 11 provides data to an input port ("RX Data In") of the radio controller and interface 9. An external process, via an output port ("RX Data Out") of the radio controller and interface 9, may then use this data. The external process may be any one of a number of processes performed with data that is either received via the receiver 11 or is to be transmitted via the transmitter 13 to a remote receiver.

During a transmit mode of operation, the radio controller and interface 9 receives source data at an input port ("TX Data In") from an external source. The radio controller and interface 9 then applies the data to an encoder 21 of the transmitter 13 via an output port ("TX Data Out"). In addition, the radio controller and interface 9 provides control signals to the transmitter 13 for use in identifying the signaling sequence of UWB pulses. In some embodiments of the present invention, the receiver 11 and the transmitter 13 functions may use joint resources, such as a common timing generator and/or a common antenna, for example. The encoder 21 receives user coding information and data from the radio controller and interface 9 and preprocesses the data and coding so as to provide a timing input for the UWB waveform generator 17, which produces UWB pulses encoded in shape and/or time to convey the data to a remote location.

The encoder 21 produces the control signals necessary to generate the required modulation. For example, the encoder 21 may take a serial bit stream and encode it with a forward error correction (FEC) algorithm (e.g., such as a Reed Solomon code, a Golay code, a Hamming code, a Convolutional code, etc.). The encoder 21 may also interleave the data to guard against burst errors. The encoder 21 may also apply a whitening function to prevent long strings of "ones" or "zeros." The encoder 21 may also apply a user specific spectrum spreading function, such as generating a predetermined length chipping code that is sent as a group to represent a bit (e.g., inverted for a "one" bit and non-inverted for a "zero" bit, etc.). The encoder 21 may divide the serial bit stream into subsets in order to send multiple bits per wavelet or per chipping code, and generate a plurality of control signals in order to affect any combination of the modulation schemes as described above (and/or as described in Lathi).

The radio controller and interface 9 may provide some identification, such as user ID, etc., of the source from which the data on the input port ("TX Data In") is received. In one embodiment of the present invention, this user ID may be inserted in the transmission sequence, as if it were a header of an information packet. In other embodiments of the present invention, the user ID itself may be employed to encode the data, such that a receiver receiving the transmission would need to postulate or have a priori knowledge of the user ID in order to make sense of the data. For example, the E) may be used to apply a different amplitude signal (e.g., of amplitude "f") to a fast modulation control signal to be discussed with respect to FIG. 2, as a way of impressing the encoding onto the signal.

The output from the encoder 21 is applied to a UWB waveform generator 17. The UWB waveform generator 17 produces a UWB pulse sequence of pulse shapes at pulse times according to the command signals it receives, which may be one of any number of different schemes. The output from the UWB generator 17 is then provided to an antenna 15, which then transmits the UWB energy to a receiver.

In one UWB modulation scheme, the data may be encoded by using the relative spacing of transmission pulses (e.g., PPM, chirp, etc.). In other UVWB modulation schemes, the data may be encoded by exploiting the shape of the pulses as described above (and/or as described in Lathi). It should be noted that the present invention is able to combine time modulation (e.g., such as pulse position modulation, chirp, etc.) with other modulation schemes that manipulate the shape of the pulses.

There are numerous advantages to the above capability, such as communicating more than one data bit per symbol transmitted from the transmitter 13, etc. An often even more important quality, however, is the application of such technique to implement spread-spectrum, multi-user systems, which require multiple spreading codes (e.g., such as each with spike autocorrelation functions, and jointly with low peak cross-correlation functions, etc.).

In addition, combining timing, phase, frequency, and amplitude modulation adds extra degrees of freedom to the spreading code functions, allowing greater optimization of the cross-correlation and autocorrelation characteristics. As a result of the improved autocorrelation and cross-correlation characteristics, the system according to the present invention has improved capability, allowing many transceiver units to operate in close proximity without suffering from interference from one another.

Figure 2:
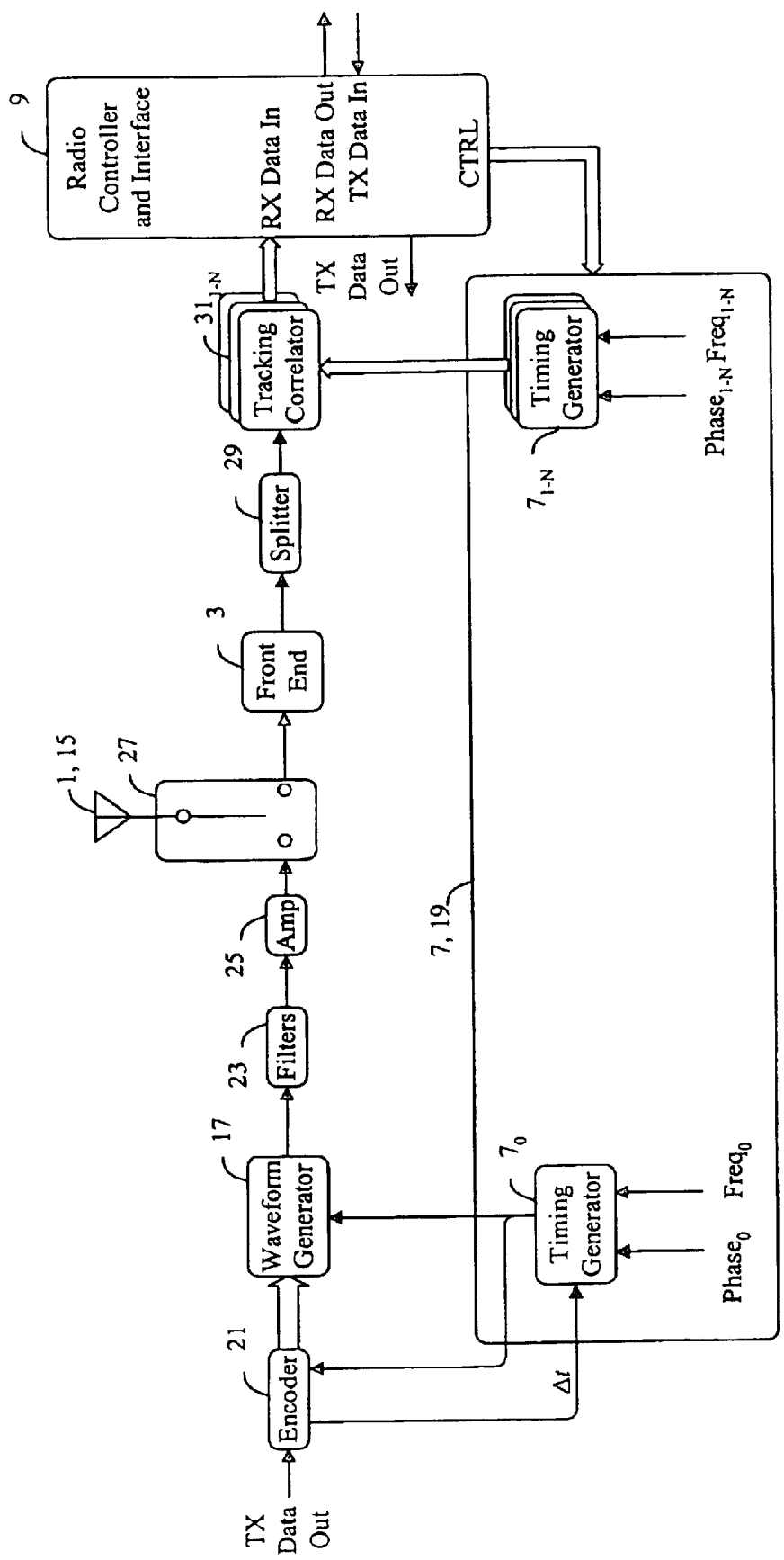
FIG. 2 is a block diagram of the transceiver of FIG. 1a, that manipulates a shape of UWB pulses, according to the present invention.

FIG. 2 is a block diagram of a transceiver embodiment of the present invention in which the modulation scheme employed is able to manipulate the shape and time of the UWB pulses. In FIG. 2, when receiving energy through the antenna 1, 15 (e.g., corresponding antennas 1 and 15 of FIG. 1a) the energy is coupled in to a transmit/receive (T/R) switch 27, which passes the energy to a radio front end 3. The radio front end 3 filters, extracts noise, and adjusts the amplitude of the signal before providing the same to a splitter 29. The splitter 29 divides the signal up into one of N different signals and applies the N different signals to different tracking correlators $31_1$–$31_N$. Each of the tracking correlators $31_1$–$31_N$ receives a clock input signal from a respective timing generator $7_1$–$7_N$ of a timing generator module 7, 19, as shown in FIG. 2.

The timing generators $7_1$–$7_N$, for example, receive a phase and frequency adjustment signal, as shown in FIG. 2, but may also receive a fast modulation signal or other control signal(s) as well. The radio controller and interface 9 provides the control signals, such as phase, frequency and fast modulation signals, etc., to the timing generator module 7, 19, for time synchronization and modulation control. The fast modulation control signal may be used to implement, for example, chirp waveforms, PPM waveforms, such as fast time scale PPM waveforms, etc.

The radio controller and interface 9 also provides control signals to, for example, the encoder 21, the waveform generator 17, the filters 23, the amplifier 25, the T/R switch 27, the front end 3, the tracking correlators $31_1$–$31_N$ (corresponding to the UWB waveform correlator 5 of FIG. 1a), etc., for controlling, for example, amplifier gains, signal waveforms, filter passbands and notch functions, alternative demodulation and detecting processes, user codes, spreading codes, cover codes, etc.

During signal acquisition, the radio controller and interface 9 adjusts the phase input of, for example, the timing generator $7_1$, in an attempt for the tracking correlator $31_1$ to identify and the match the timing of the signal produced at the receiver with the timing of the arriving signal. When the received signal and the locally generated signal coincide in time with one another, the radio controller and interface 9 senses the high signal strength or high SNR and begins to track, so that the receiver is synchronized with the received signal.

Once synchronized, the receiver will operate in a tracking mode, where the timing generator $7_1$ is adjusted by way of a continuing series of phase adjustments to counteract any differences in timing of the timing generator $7_1$ and the incoming signal. However, a feature of the present invention is that by sensing the mean of the phase adjustments over a known period of time, the radio controller and interface 9 adjusts the frequency of the timing generator $7_1$ so that the mean of the phase adjustments becomes zero. The frequency is adjusted in this instance because it is clear from the pattern of phase adjustments that there is a frequency offset between the timing generator $7_1$ and the clocking of the received signal. Similar operations may be performed on timing generators $7_2$–$7_N$, so that each receiver can recover the signal delayed by different amounts, such as the delays caused by multipath (i.e., scattering along different paths via reflecting off of local objects).

A feature of the transceiver in FIG. 2 is that it includes a plurality of tracking correlators $31_1$–$31_N$. By providing a plurality of tracking correlators, several advantages are obtained. First, it is possible to achieve synchronization more quickly (i.e., by operating parallel sets of correlation arms to find strong SNR points over different code-wheel segments). Second, during a receive mode of operation, the multiple arms can resolve and lock onto different multipath components of a signal. Through coherent addition, the UWB communication system uses the energy from the different multipath signal components to reinforce the received signal, thereby improving signal to noise ratio. Third, by providing a plurality of tracking correlator arms, it is also possible to use one arm to continuously scan the channel for a better signal than is being received on other arms.

In one embodiment of the present invention, if and when the scanning arm finds a multipath term with higher SNR than another arm that is being used to demodulate data, the role of the arms is switched (i.e., the arm with the higher SNR is used to demodulate data, while the arm with the lower SNR begins searching). In this way, the communications system dynamically adapts to changing channel conditions.

The radio controller and interface 9 receives the information from the different tracking correlators $31_1$–$31_N$ and decodes the data. The radio controller and interface 9 also provides control signals for controlling the front end 3, e.g., such as gain, filter selection, filter adaptation, etc., and adjusting the synchronization and tracking operations by way of the timing generator module 7, 19.

In addition, the radio controller and interface 9 serves as an interface between the communication link feature of the present invention and other higher level applications that will use the wireless UWB communication link for performing other functions. Some of these functions would include, for example, performing range-finding operations, wireless telephony, file sharing, personal digital assistant (PDA) functions, embedded control functions, location-finding operations, etc.

On the transmit portion of the transceiver shown in FIG. 2, a timing generator $7_0$ also receives phase, frequency and/or fast modulation adjustment signals for use in encoding a UWB waveform from the radio controller and interface 9. Data and user codes (via a control signal) are provided to the encoder 21, which in the case of an embodiment of the present invention utilizing time-modulation, passes command signals (e.g., $\Delta t$) to the timing generator $7_0$ for providing the time at which to send a pulse. In this way, encoding of the data into the transmitted waveform may be performed.

When the shape of the different pulses are modulated according to the data and/or codes, the encoder 21 produces the command signals as a way to select different shapes for generating particular waveforms in the waveform generator 17. For example, the data may be grouped in multiple data bits per channel symbol. The waveform generator 17 then produces the requested waveform at a particular time as indicated by the timing generator $7_0$. The output of the waveform generator is then filtered in filter 23 and amplified in amplifier 25 before being transmitted via antenna 1, 15 by way of the T/R switch 27.

In another embodiment of the present invention, the transmit power is set low enough that the transmitter and receiver are simply alternately powered down without need for the T/R switch 27. Also, in some embodiments of the present invention, neither the filter 23 nor the amplifier 25 is needed, because the desired power level and spectrum is directly useable from the waveform generator 17. In addition, the filters 23 and the amplifier 25 may be included in the waveform generator 17 depending on the implementation of the present invention.

A feature of the UWB communications system disclosed, is that the transmitted waveform x(t) can be made to have a nearly continuous power flow, for example, by using a high chipping rate, where the wavelets g(t) are placed nearly back-to-back. This configuration allows the system to operate at low peak voltages, yet produce ample average transmit power to operate effectively. As a result, sub-micron geometry CMOS switches, for example, running at one-volt levels, can be used to directly drive antenna 1, 15, such that the amplifier 25 is not required. In this way, the entire radio can be integrated on a single monolithic integrated circuit.

Under certain operating conditions, the system can be operated without the filters 23. If, however, the system is to be operated, for example, with another radio system, the filters 23 can be used to provide a notch function to limit interference with other radio systems. In this way, the system can operate simultaneously with other radio systems, providing advantages over conventional devices that use avalanching type devices connected straight to an antenna, such that it is difficult to include filters therein.

Figure 3:
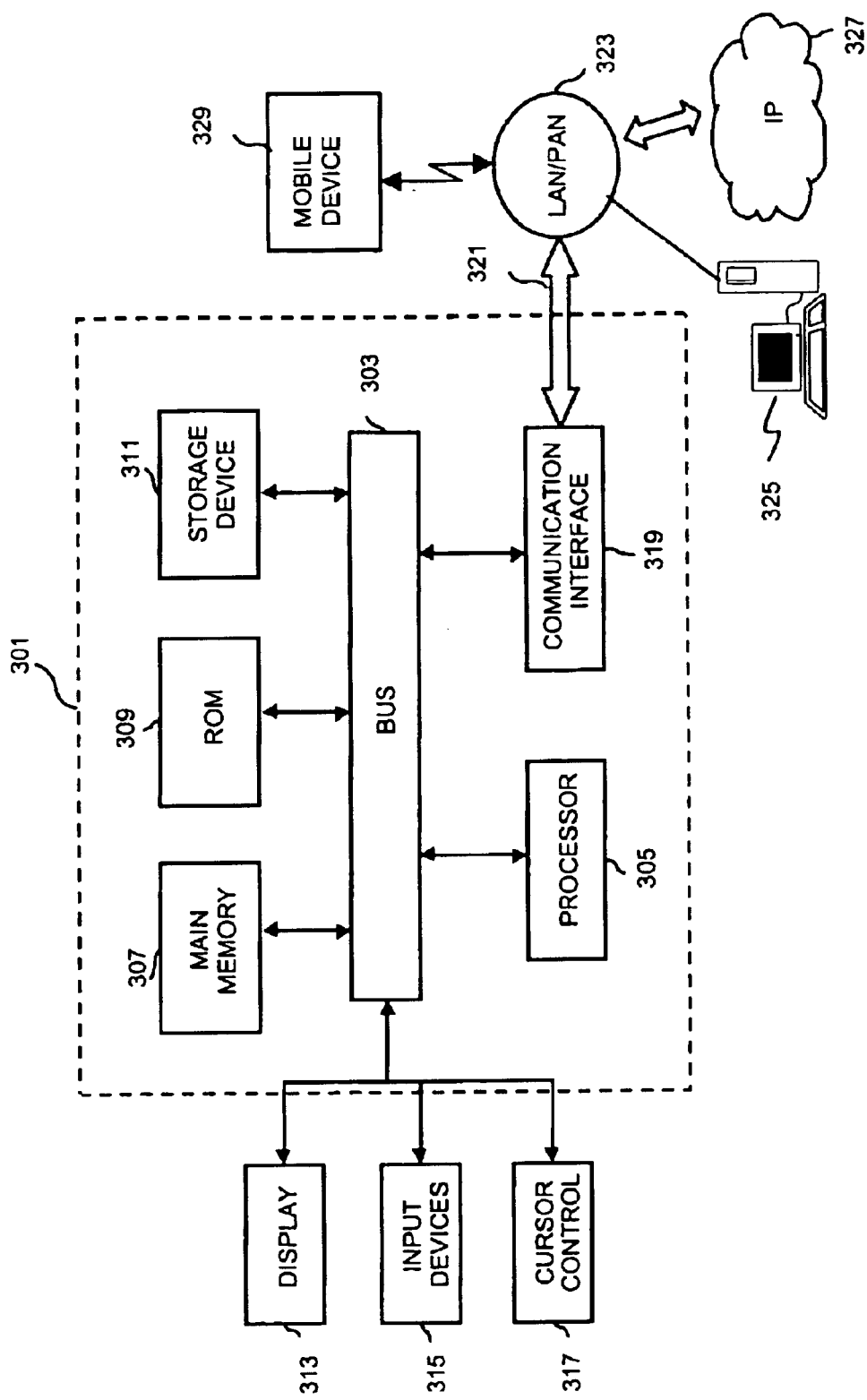
FIG. 3 is a schematic diagram of a general-purpose microprocessor-based or digital signal processor-based system, which can be programmed by a skilled programmer to implement the features of the present invention.

The UWB transceiver of FIG. 1a or 2 may be used to perform a radio transport function for interfacing with different applications as part of a stacked protocol architecture. In such a configuration, the UWB transceiver performs signal creation, transmission and reception functions as a communications service to applications that send data to the transceiver and receive data from the transceiver much like a wired I/O port. Moreover, the UWB transceiver may be used to provide a wireless communications function to any one of a variety of devices that may include interconnection to other devices either by way of wired technology or wireless technology. Thus, the UWB transceiver of FIG. 1a or 2 may be used as part of a local area network (LAM connecting fixed structures or as part of a wireless personal area network (WPAN connecting mobile devices, for example. In any such implementation, all or a portion of the present invention may be conveniently implemented in a microprocessor system using conventional general purpose microprocessors programmed according to the teachings of the present invention, as will be apparent to those skilled in the microprocessor systems art. Appropriate software can be readily prepared by programmers of ordinary skill based on the teachings of the present disclosure, as will be apparent to those skilled in the software art FIG. 3 illustrates a processor system 301 upon which an embodiment according to the present invention may be implemented. The system 301 includes a bus 303 or other communication mechanism for communicating information, and a processor 305 coupled with the bus 303 for processing the information. The processor system 301 also includes a main memory 307, such as a random access memory (RAM) or other dynamic storage device (e.g., dynamic RAM (DRAM), static RAM (SRAM), synchronous DRAM (SDRAM), flash RAM), coupled to the bus 303 for storing information and instructions to be executed by the processor 305. In addition, a main memory 307 may be used for storing temporary variables or other intermediate information during execution of instructions to be executed by the processor 305. The system 301 further includes a read only memory (ROM) 309 or other static storage device (e.g., programmable ROM (PROM), erasable PROM (EPROM), and electrically erasable PROM (EEPROM)) coupled to the bus 303 for storing static information and instructions for the processor 305. A storage device 311, such as a magnetic disk or optical disc, is provided and coupled to the bus 303 for storing information and instructions.

The processor system 301 may also include special purpose logic devices (e.g., application specific integrated circuits (ASICs)) or configurable logic devices (e.g, simple programmable logic devices (SPLDs), complex programmable logic devices (CPLDs), or re-programmable field programmable gate arrays (FPGAs)). Other removable media devices (e.g., a compact disc, a tape, and a removable magneto-optical media) or fixed, high density media drives, may be added to the system 301 using an appropriate device bus (e.g., a small system interface (SCSI) bus, an enhanced integrated device electronics (IDE) bus, or an ultra-direct memory access (DMA) bus). The system 301 may additionally include a compact disc reader, a compact disc reader-writer unit, or a compact disc juke box, each of which may be connected to the same device bus or another device bus.

The processor system 301 may be coupled via the bus 303 to a display 313, such as a cathode ray tube (CRT) or liquid crystal display (LCD) or the like, for displaying information to a system user. The display 313 may be controlled by a display or graphics card. The processor system 301 includes input devices, such as a keyboard or keypad 315 and a cursor control 317, for communicating information and command selections to the processor 305. The cursor control 317, for example, is a mouse, a trackball, or cursor direction keys for communicating direction information and command selections to the processor 305 and for controlling cursor movement on the display 313. In addition, a printer may provide printed listings of the data structures or any other data stored and/or generated by the processor system 301.

The processor system 301 performs a portion or all of the processing steps of the invention in response to the processor 305 executing one or more sequences of one or more instructions contained in a memory, such as the main memory 307. Such instructions may be read into the main memory 307 from another computer-readable medium, such as a storage device 311. One or more processors in a multi-processing arrangement may also be employed to execute the sequences of instructions contained in the main memory 307. In alternative embodiments, hard-wired circuitry may be used in place of or in combination with software instructions. Thus, embodiments are not limited to any specific combination of hardware circuitry and software.

As stated above, the processor system 301 includes at least one computer readable medium or memory programmed according to the teachings of the invention and for containing data structures, tables, records, or other data described herein. Stored on any one or on a combination of computer readable media, the present invention includes software for controlling the system 301, for driving a device or devices for implementing the invention, and for enabling the system 301 to interact with a human user. Such software may include, but is not limited to, device drivers, operating systems, development tools, and applications software. Such computer readable media further includes the computer program product of the present invention for performing all or a portion (if processing is distributed) of the processing performed in implementing the invention.

The computer code devices of the present invention may be any interpreted or executable code mechanism, including but not limited to scripts, interpretable programs, dynamic link libraries, Java or other object oriented classes, and complete executable programs. Moreover, parts of the processing of the present invention may be distributed for better performance, reliability, and/or cost.

The term "computer readable medium" as used herein refers to any medium that participates in providing instructions to the processor 305 for execution. A computer readable medium may take many forms, including but not limited to, non-volatile media, volatile media, and transmission media. Non-volatile media includes, for example, optical, magnetic disks, and magneto-optical disks, such as the storage device 311. Volatile media includes dynamic memory, such as the main memory 307. Transmission media includes coaxial cables, copper wire and fiber optics, including the wires that comprise the bus 303. Transmission media may also take the form of acoustic or light waves, such as those generated during radio wave and infrared data communications.

Common forms of computer readable media include, for example, hard disks, floppy disks, tape, magneto-optical disks, PROMs (EPROM, EEPROM, Flash EPROM), DRAM, SRAM, SDRAM, or any other magnetic medium, compact disks (e.g., CD-ROM), or any other optical medium, punch cards, paper tape, or other physical medium with patterns of holes, a carrier wave, carrierless transmissions, or any other medium from which a system can read.

Various forms of computer readable media may be involved in providing one or more sequences of one or more instructions to the processor 305 for execution. For example, the instructions may initially be carried on a magnetic disk of a remote computer. The remote computer can load the instructions for implementing all or a portion of the present invention remotely into a dynamic memory and send the instructions over a telephone line using a modem. A modem local to system 301 may receive the data on the telephone line and use an infrared transmitter to convert the data to an infrared signal. An infrared detector coupled to the bus 303 can receive the data carried in the infrared signal and place the data on the bus 303. The bus 303 carries the data to the main memory 307, from which the processor 305 retrieves and executes the instructions. The instructions received by the main memory 307 may optionally be stored on a storage device 311 either before or after execution by the processor 305.

The processor system 301 also includes a communication interface 319 coupled to the bus 303. The communications interface 319 provides a two-way UWB data communication coupling to a network link 321 that is connected to a communications network 323 such as a local network (LAN) or personal area network (PAN) 323. For example, the communication interface 319 may be a network interface card to attach to any packet switched UWB-enabled personal area network (PAN) 323. As another example, the communication interface 319 may be a UWB accessible asymmetrical digital subscriber line (ADSL) card, an integrated services digital network (ISDN) card, or a modem to provide a data communication connection to a corresponding type of communications line. The communications interface 319 may also include the hardware to provide a two-way wireless communications coupling other than a UWB coupling, or a hardwired coupling to the network link 321. Thus, the communications interface 319 may incorporate the UWB transceiver of FIG. 2 as part of a universal interface that includes hardwired and non-UWB wireless communications coupling to the network link 321.

The network link 321 typically provides data communication through one or more networks to other data devices. For example, the network link 321 may provide a connection through a LAN to a host computer 325 or to data equipment operated by a service provider, which provides data communication services through an IP (Internet Protocol) network 327. Moreover, the network link 321 may provide a connection through a PAN 323 to a mobile device 329 such as a personal digital assistant (PDA) laptop computer, or cellular telephone. The LAN/PAN communications network 323 and IP network 327 both use electrical, electromagnetic or optical signals that carry digital data streams. The signals through the various networks and the signals on the network link 321 and through the communication interface 319, which carry the digital data to and from the system 301, are exemplary forms of carrier waves transporting the information. The processor system 301 can transmit notifications and receive data, including program code, through the network(s), the network link 321 and the communication interface 319.

The encoder 21 and waveform generator 17 of the transceiver of the present invention function together to create a UWB waveform from a digital data stream by first, multiplying each bit of data in the data stream by an identifying code (e.g., an n-bit user code), thereby expanding each bit of data into a codeword of data bits equal in length to the length of the identifying code. In one embodiment, the codeword is then further processed to create two derivative codewords that are that are sent to the UWB waveform generator 17 where they are mixed with a pulse generator and recombined through a two-stage mixing process prior to being transmitted via the antenna 15.

As stated above, the encoder 21 receives a digital data stream from an external source via the radio and controller interface 9. The encoder 21 multiplies each bit of the digital data stream by a user code, which in one embodiment is a unique sequence of bits corresponding to a particular user. For example, multiplying a user code of '1101 0110' by a data bit of '1' results in an 8-bit representation of the '1' that is identical to the user code, or '1101 0110.' On the other hand, multiplying that same user code by a data bit of '0' results in an 8-bit representation of the '0' that is the 8 bits of the user code inverted, or '0010 1001.'

Continuing with the above example, the encoder 21 multiplies the user code by each bit of the digital data stream to create a sequence of n-bit codewords, where n is the length of the user code. Once the digital data stream has been encoded, the UWB waveform generator 17 further processes the sequence of codewords in creating an UWB waveform that can be transmitted.

Figure 4:
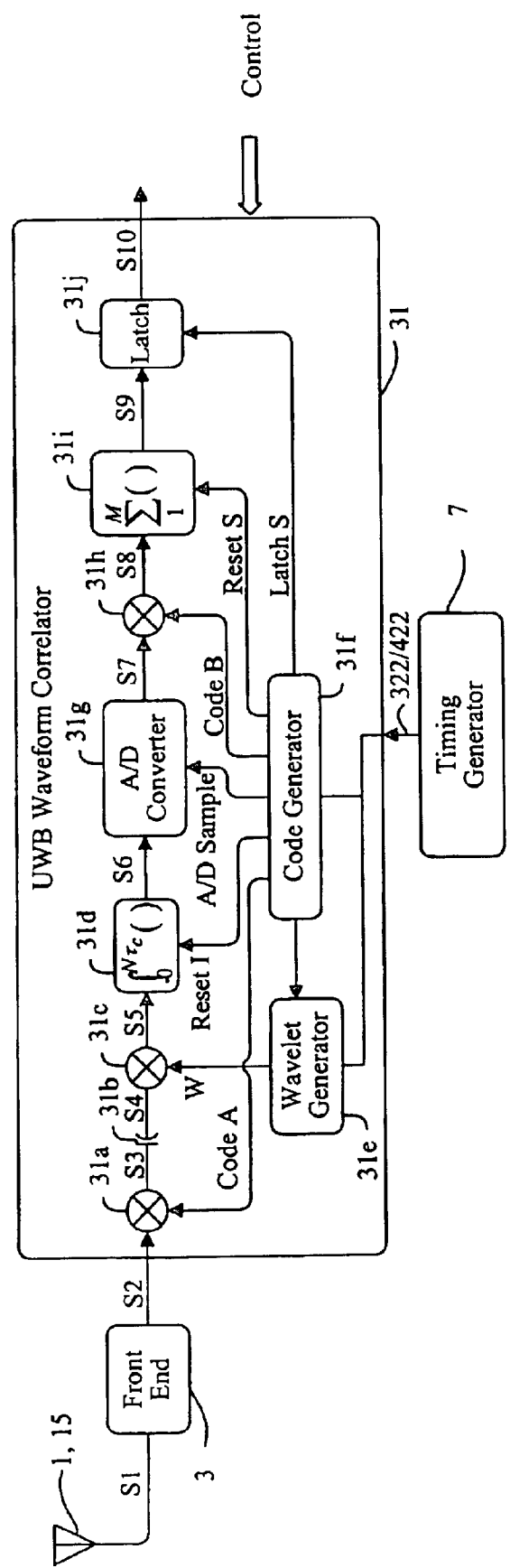
FIG. 4 is a schematic diagram of an ultra wideband receiver and waveform correlator according to one embodiment of the present invention.
Figure 5:
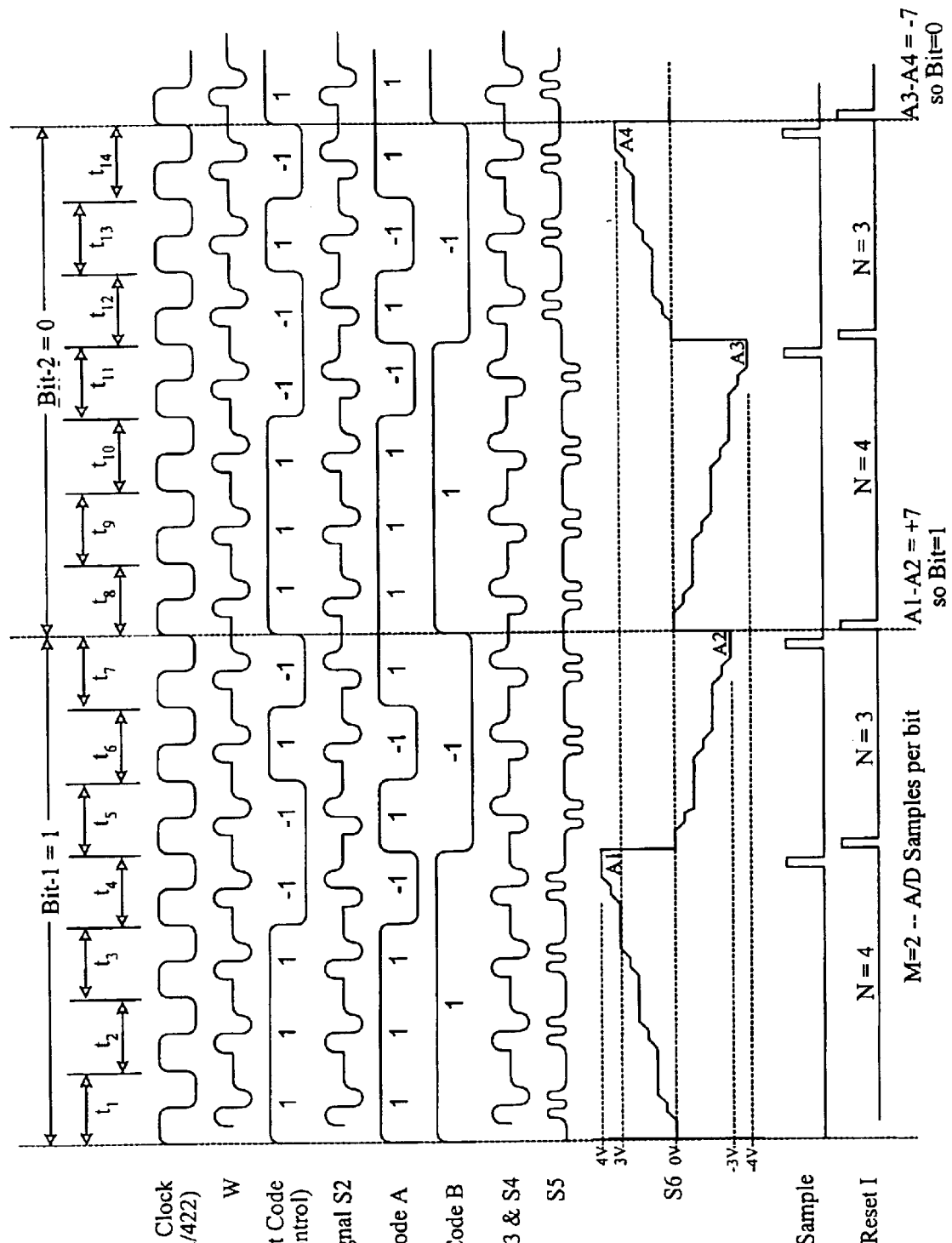
FIG. 5 is an exemplary timing chart illustrating the signals at the various inputs and outputs of the components in FIG. 4.

FIG. 4 illustrates the details of the UWB waveform correlator 31 of FIG. 2, according to the present invention. FIG. 5 is a timing diagram corresponding to the signals discussed with respect to FIG. 4. As shown in FIG. 4, a propagated signal S1 is coupled to the antenna 1, 15, and is amplified and filtered by the front end 3. The front end 3 outputs a signal S2, which is input to a first mixer 31a. The first mixer 31a mixes the incoming signal S2 with a Code A signal to produce an output signal S3. The signal S3 passes through a simple DC blocking capacitor 31b, or other DC blocking filter network which will block any DC bias component of the signal S3, resulting in a new signal S4. The signal S4 is mixed via mixer 31c with a sequence of UWB wavelets W from the wavelet generator 31e. The wavelet generator 31e is triggered by the signal 322/422 of the timing generator 7 to generate the UWB wavelets W. The output of the mixer 31c is signal S5, which may include a DC component. Signal S5 is passed to an integrator 31d. The integrator 31d integrates signal S5 for a predetermined number of clock pulses, outputting signal S6, as shown in FIG. 5. In the exemplary timing diagram of FIG. 5, the integrator has integrated signal S5 for four clock pulses, resulting in an output level signal S6 of four volts.

After the predetermined number of clock pulses (e.g., four in the example shown in FIG. 5), the integrator 31d is reset by the signal Reset I. After being reset, the integrator 31d continues to integrate signal S5 for a second predetermined number of clock pulses. Continuing with the example of FIG. 5, the integrator 31d will continue to integrate the signal S5 for three clock pulses from the point indicated as A1 in FIG. 5 to the point indicated as A2. Since the signal S5 being integrated is made up of negative-amplitude small pulses for the period of time beginning at point A1 and ending at point A2, the integrator 31d will integrate down for those three clock pulses, as shown by signal S6 of FIG. 5. In this example the resultant output level signal S6 is −3 volts.

As shown in FIG. 5, the A/D converter 31g samples the signal S6 after both the first predetermined number of clock pulses (e.g., the first four clock pulses) indicated as point A1 in FIG. 5, and after the second predetermined number of clock pulses (e.g., the second three clock pulses) indicated as point A2 in FIG. 5. In a similar manner the A/D converter 31g continues to sample the signal S6 at points A3, A4, and so on. The output of the A/D converter 31g is signal S7, which is multiplied with a Code B signal by a digital multiplier 31h. As shown in the exemplary timing diagram shown in FIG. 5, the Code B signal is used to invert the signal S7 for every second sample (i.e., the signal S6 sampled at points A2 and A4 where the integrator had integrated negative amplitude pulses). A summer 31i sums, for example, two consecutive samples (e.g., M=2) on the signal S7 corresponding to the points A1 and A2 (or A3 and A4) shown in FIG. 5.

Accordingly, the signal S9 is the result of the signal S6 sampled at the point A1 multiplied by +1, plus the signal S6 sampled at the point A2 multiplied by −1 (i.e., S9=+1×A1+ −1×A2). Latch 31j latches the value of signal S9 as signal S 10, then summer 31i is reset via signal Reset S. The latch 31j ensures proper alignment of the signal S10, which is provided to the radio controller and interface 9.

Control signals (indicated as "Control" in FIG. 4) are also provided to the waveform correlator 31 from the radio controller and interface 9. The Control signals communicate the parameters (e.g., code length, code values, etc.) of the actual codes generated by the code generator 31f (e.g., Code A, Code B, Xmit Code, etc.). A transmit code, Xmit Code, is shown, for example, as a seven-bit length code in FIG. 5. The Control signals also program the wavelet generator 31e via the code generator 31f for different wavelet styles (e.g., odd symmetry, even symmetry, different center frequency wavelets, different amplitudes, different phases, wavelet width, etc). The control signals can also program code B, for example, to always be a positive value (e.g., +1), and the A/D converter 31g and integrator 31d to integrate and sample only once per bit. In this example, the digital multiplier 31h and summer 31i would not be required since the signal S7 would always be multiplied by +1 (i.e., S8=+1×S7). The control signals might also program code B, for example, to be an L-length sequence of plus and minus ones, code A to repeat L times for each bit, and the A/D 31g and integrator 31d to integrate and sample once per Code A repetition. In this way, if Code A were, for example, an M-length sequence, then a bit would be comprised of M*L chips.

The benefits of the two-stage mixing technique may be gained through various embodiments of the present invention, as would be understood by one of ordinary skill in the digital signal processing art based on the teachings of the present discussion. The embodiment shown in FIG. 4 mixing a user code (Code A) with a received signal at a first mixer 31a, then mixing the output of that first mixer 31a with the output of a wavelet generator (W) is only one exemplary one technique for using a two-stage mixing approach to eliminate spurious spectral spikes caused by non-ideal analog devices such as the mixers 31a and 31c in a UWB receiver.

As discussed above, a NRZ data source has been encoded prior to transmission with an n-bit user code. As shown in FIGS. 4 and 5, the received signal is mixed with Code A at a first mixer 31a. Code A corresponds to the first four bits of the user code (Xmit Code) used to encode the data source and the last three bits of the user code inverted. By inverting a portion of the user code at the receiver, the problems of self-jamming described in the BACKGROUND OF THE INVENTION section, are avoided. Since the signal being supplied to the leakage-prone first mixer 31a is not the same as the signal that the receiver is attempting to receive, the problems of self-jamming are avoided, as would be understood by one of ordinary skill in the digital signal processing art in light of the present discussion.

Figure 6A:
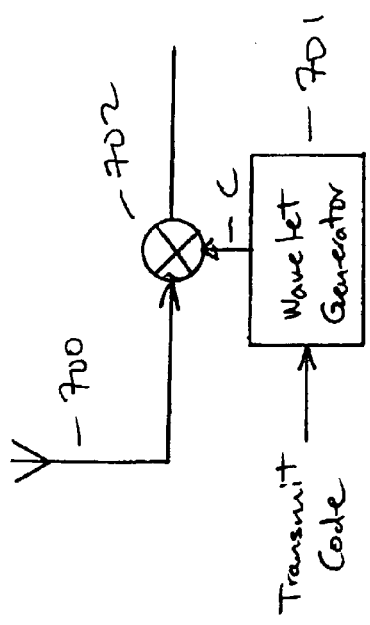
FIG. 6A is a schematic diagram of a generalized single stage mixing circuit susceptible to self-jamming.

FIG. 6A is a schematic diagram of a generalized single stage mixing circuit for use in an ultra wideband receiver. As shown in FIG. 6A, the receiver includes an antenna 700, a wavelet generator 701, and mixer 702. As discussed above, the receiver of FIG. 6A will be susceptible to self-jamming and self-noise since the output of the wavelet generator 701, being mixed with the received signal at mixer 702 has the same characteristics as the signal being looked for by the receiver. Due to the leakage by the mixer 702 the antenna 700 may receive not only the signal being looked for, but also the leaked signal having similar properties to the signal being looked for resulting in a self-jamming of the receiver.

Figure 6B:
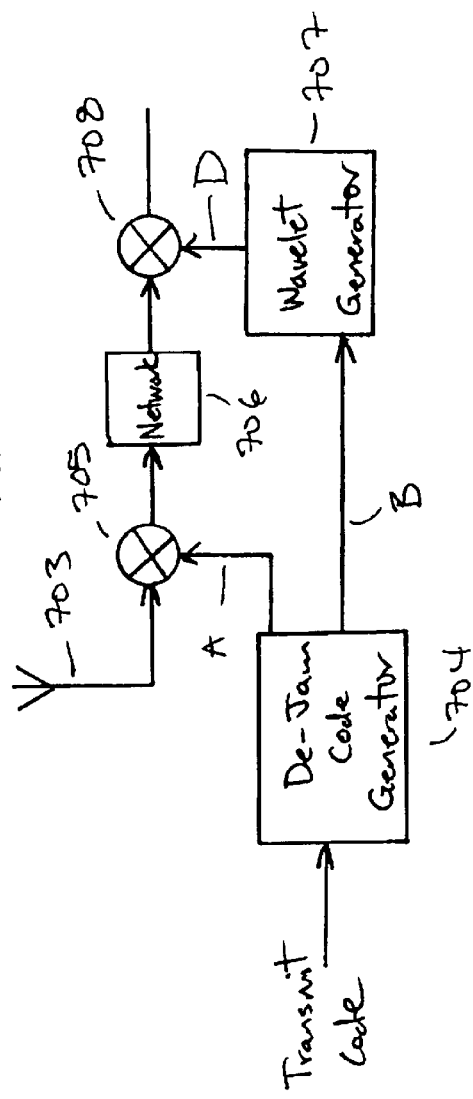
FIG. 6B is a schematic diagram of a generalized two-stage mixing circuit for avoiding self-noise in an ultra wideband receiver according to the present invention.

FIG. 6B is a schematic diagram of a generalized two-stage mixing circuit for achieving noise cancellation and avoiding self-jamming in an ultra wideband receiver according to the present invention. As shown in FIG. 6B, the receiver includes an antenna 703, a de-jam code generator 704, a first mixer 705, a network 706, a wavelet generator 707, and a second mixer 708. As discussed above, the present invention uses a two-stage mixing to cancel self-noise caused by the non-ideal analog mixers 705, 708 and to avoid self-jamming. The network 706 is used to block any DC bias produced at the first mixer 705. The concepts taught herein provide advantages to UWB systems regardless of the encoding or modulation scheme being used.

By changing the circuitry of the de-jam code generator 704 and the wavelet generator 707, many different encoding and modulation schemes may be received, such as those described in co-pending application Ser. No. 09/685,205, entitled SYSTEM AND METHOD FOR GENERATING ULTRA WIDEBAND PULSES. For example, the received UWB wavelets coupled to the antenna 700 may, for example, be bi-phase wavelets, multi-level bi-phase wavelets, quad-phase wavelets, multi-level quad-phase wavelets, or other shapes used to encode a NRZ data source at the transmitter. Decoding is achieved by providing the de-jam code generator with the transmit code used by the transmitter to generate two signals that are mixed with the received signals via a two-stage mixing approach.

As described in the context of FIGS. 4 and 5, the receiver can avoid self-jamming by mixing the received waveform with a waveform having different characteristics than the signal being looked for. As shown in FIG. 6B, the de-jam code generator generates two codes A, B that are mixed with the received signal at the first mixer 705 and the second mixer 708, respectively. Signal is used to shape the wavelets corresponding to the wavelet shaping scheme used by the transmitter. Wavelet shaping schemes are described in co-pending application Ser. No. 09/685,205, entitled SYSTEM AND METHOD FOR GENERATING ULTRA WIDEBAND PULSES. The output generated by the wavelet generator 707 (signal D) is mixed with the received signal at mixer 708. Unlike signal C produced by the wavelet generator in FIG. 6A, the two signals that are mixed with the received signal in FIG. 6B (i.e., A and D) are different than the signal being looked for. Signals A and D that are mixed with the received signal have properties such that if A and D were mixed together, the resultant waveform would be the same as signal C generated by the wavelet generator in the single mixer scheme of FIG. 6A.

The de-jam code generator 701 in combination with the wavelet generator 704 can implement a variety of schemes for decoding the received UWB waveform and achieving the advantageous results described herein.

Obviously, numerous modifications and variations of the present invention are possible in light of the above teachings. It is therefore to be understood that within the scope of the appended claims, the invention may be practiced otherwise than as specifically described herein.

What is claimed is:

1. An ultra wideband receiver that suppresses self-noise, comprising:
   a first mixer having a first input, a second input and an output;
   a second mixer having a first input coupled to the output of the first mixer, a second input and an output;
   a codeword generator configured to generate an n-bit non-return-to-zero codeword having a same predetermined sequence of bits as an encoding codeword used to encode a transmitted data stream and invert a predetermined number of bits of the n-bit non-return-to-zero codeword; and
   a wavelet generator having an output coupled to the second input of the second mixer and configured to output a sequence of ultra wideband wavelets having a predetermined shape, wherein
   ultra wideband wavelets received via an antenna coupled to the first input of the first mixer, the wavelets having encoded therein the transmitted data stream encoded with the n-bit non-return-to-zero codeword,
   the n-bit non-return-to-zero codeword is input to the second input of the first mixer, and
   the output of the second mixer is a detection waveform having decoded therein the transmitted data stream.

2. The receiver of claim 1, further comprising:
   an integrator having an input and an output, wherein
   the output of the second mixer is coupled to the input of the integrator, and
   a signal output by the integrator is used to decode the transmitted data stream from the detection waveform.

3. The receiver of claim 1, further comprising:
   a network coupled between the output of the first mixer and the first input of the second mixer configured to block a DC component of a signal output by the first mixer.

4. A method for suppressing self-noise in an ultra wideband receiver, comprising the steps of:
   receiving a received signal of ultra wideband wavelets having encoded therein a transmitted data stream via an antenna;
   generating an n-bit non-return-to-zero codeword having a same predetermined sequence of bits as an encoding codeword used by a transmitter for encoding the transmitted data stream, a predetermined number of bits of the n-bit non-return-to-zero codeword being inverted;
   mixing the received signal with the n-bit non-return-to-zero codeword to produce an intermediate signal;
   generating an ultra wideband wavelet signal having a sequence of ultra wideband wavelets having a same shape as ultra wideband wavelets used by the transmitter of the received signal; and
   mixing the intermediate signal with the ultra wideband wavelet signal to produce a detection waveform.

5. The method of claim 4, further comprising:
   integrating the detection waveform to decode the transmitted data stream.

6. The method of claim 4, further comprising:
   blocking a DC component of the intermediate signal.

7. The method of claim 4, further comprising:
   multiplying the integrated detection waveform with an adjusting codeword,
   wherein a product of the n-bit non-return-to-zero codeword and the adjusting codeword is equivalent to a transmit codeword used to encode the received signal.

8. The method of claim 4,
   wherein the n-bit non-return-to-zero codeword comprises a first non-return-to-zero portion and a second non-return-to-zero portion,
   wherein the first non-return-to-zero portion has equivalent signal values with respect to a corresponding first transmit portion in a transmit codeword used to encode the received signal, and
   wherein the second non-return-to-zero portion has inverse signal values with respect to a corresponding second transmit portion in the transmit codeword.

9. The method of claim 5, wherein the integrating of the detection waveform is performed separately over two or more portions of the detection waveform, a combined length of the two or more portions being n-bits.

10. A computer program product, comprising:
    a computer storage medium; and
    a computer program code mechanism embedded in the computer storage medium for performing an ultra wideband receiver self-noise suppressing method, the computer program code mechanism having
    a first computer code device configured to generate an n-bit non-return-to-zero codeword having a same predetermined sequence of bits as an encoding codeword used by a transmitter for encoding a transmitted data stream, a predetermined number of bits of the n-bit non-return-to-zero codeword being inverted for mixing with a received signal to produce an intermediate signal;
    a second computer code device configured to generate an ultra wideband wavelet signal having a sequence of ultra wideband wavelets having a same shape as ultra wideband wavelets used by the transmitter of the received signal for mixing with the intermediate signal to produce a detection waveform.

11. An ultra wideband receiver that suppresses self-noise, comprising:

a de-jam code generator having a first input, a first output, and a second output, the first input being configured to receive a transmit code used by an ultra wideband transmitter, the first output and the second output being configured such that mixing the first output with the second output produces a waveform that correlates to a transmitted waveform being received;

a first mixer having a first input, a second input, and an output, the first input being configured to receive a waveform from an antenna, the second input being configured to receive the first output from the de-jam code generator;

a wavelet generator having an input and an output, the input being configured to receive the second output from the de-jam code generator, and the output being configured to generate a sequence of ultra wideband wavelets having a predetermined shape corresponding to an encoding scheme used by the ultra wideband transmitter; and a second mixer having a first input, a second input and an output, the first input being configured to receive the output of the first mixer, the second input being configured to receive the output of the wavelet generator, wherein the output of the second mixer is a sequence of shaped wavelets having decoded therein non-return-to-zero data transmitted by the ultra wideband transmitter.

12. A two-stage ultra wideband receiving circuit, comprising:

a first stage configured to mix a received signal with a noise suppression code and generate an intermediate signal:

a second stage configured to mix the intermediate signal with a wavelet to generate an output signal:

an integrator configured to receive and decode the output signal to provide a decoded signal; and a multiplier configured to combine the decoded signal with an adjusting code to provide an adjusted signal, wherein the noise suppression code is the same length as a transmit code used to encode the received signal, wherein the noise suppressing code differs in value from the transmit code, wherein the integrator integrates the output signal separately over two or more portions of the output signal to provide the decoded signal, and wherein the product of the noise suppression code and the adjusting code is equivalent to the transmit code.

13. A two-stare ultra wideband receiving circuit, comprising:

a first stage configured to mix a received signal with a noise suppression code and generate an intermediate signal; and a second stage configured to mix the intermediate signal with a wavelet to generate an output signal, wherein the noise suppression code is the same length as a transmit code used to encode the received signal wherein the noise suppressing code differs in value from the transmit code, wherein the noise suppression code comprises a first noise suppression portion and a second noise suppression portion, wherein the first noise suppression portion has equivalent signal values with respect to a corresponding first transmit portion in the transmit code, and wherein the second noise suppression portion has inverse signal values with respect to a corresponding second transmit portion in the transmit code.

14. The two-stage ultra wideband receiving circuit of claim 13, wherein the second noise suppression portion is a contiguous portion of the noise suppression code.

* * * * *

UNITED STATES PATENT AND TRADEMARK OFFICE
CERTIFICATE OF CORRECTION

PATENT NO. : 6,859,506 B2  Page 1 of 1
APPLICATION NO. : 09/684782
DATED : February 22, 2005
INVENTOR(S) : John W. McCorkle It is certified that error appears in the above-identified patent and that said Letters Patent is hereby corrected as shown below:

In Column 21, Line 38, Claim No. 12:

Change "signal:" to --signal;--

In Column 21, Line 40, Claim No. 12:

Change "an output signal:" to --an output signal;--

In Column 22, Line 14, Claim No. 13:

Change "A two-stare ultra wideband" to --A two-stage ultra wideband--

In Column 22, Line 22, Claim No. 13:

Change "encode the received signal" to --encode the received signal,--

Signed and Sealed this

Twenty-ninth Day of July, 2008

JON W. DUDAS
*Director of the United States Patent and Trademark Office*